(12) United States Patent
Kinney et al.

(10) Patent No.: US 8,192,533 B2
(45) Date of Patent: Jun. 5, 2012

(54) SUPPORT SYSTEM FOR EXHAUST EMISSION CONTROL ELEMENTS

(75) Inventors: Randy Kinney, Lincoln, NE (US); Alan Moyer, Lincoln, NE (US); Aaron Huff, Lincoln, NE (US)

(73) Assignee: G.T.E. Industries, Inc., Lincoln, NE (US)

( * ) Notice: Subject to any disclaimer, the term of this patent is extended or adjusted under 35 U.S.C. 154(b) by 387 days.

(21) Appl. No.: 12/485,530

(22) Filed: Jun. 16, 2009

(65) Prior Publication Data

US 2010/0313534 A1 Dec. 16, 2010

(51) Int. Cl.
*B01D 46/00* (2006.01)

(52) U.S. Cl. ............... 96/4; 55/385.3; 55/480; 55/493; 55/495; 55/508; 55/DIG. 30; 55/DIG. 31

(58) Field of Classification Search .............. 55/501, 55/508, 481–484; 96/15
See application file for complete search history.

(56) References Cited

U.S. PATENT DOCUMENTS

| | | | | |
|---|---|---|---|---|
| 2,675,094 A * | 4/1954 | Young | | 55/480 |
| 2,840,273 A * | 6/1958 | McEwen | | 222/98 |
| 3,360,910 A * | 1/1968 | Soltis | | 55/483 |
| 3,494,113 A * | 2/1970 | Kinney | | 55/481 |
| 3,693,328 A * | 9/1972 | Paucha | | 55/436 |
| 3,695,008 A * | 10/1972 | Neumann | | 55/354 |
| 4,187,531 A * | 2/1980 | Lowell et al. | | 362/17 |
| 4,586,771 A * | 5/1986 | Kraemer et al. | | 439/325 |
| 4,925,623 A * | 5/1990 | Dillmann et al. | | 376/314 |
| 5,117,899 A * | 6/1992 | Skimehorn | | 165/48.1 |
| 5,192,347 A * | 3/1993 | Lee | | 55/359 |
| 5,244,400 A * | 9/1993 | Hatagishi | | 439/157 |
| 5,332,409 A * | 7/1994 | Dralle | | 55/484 |
| 5,679,122 A * | 10/1997 | Moll et al. | | 55/497 |
| 5,863,310 A * | 1/1999 | Brown et al. | | 55/480 |
| 6,062,882 A * | 5/2000 | Hanazaki et al. | | 439/157 |
| 6,113,674 A * | 9/2000 | Graham et al. | | 95/148 |
| 6,190,431 B1 * | 2/2001 | Jeanseau et al. | | 55/385.2 |
| 6,234,893 B1 * | 5/2001 | Meredith | | 454/289 |
| 6,235,195 B1 * | 5/2001 | Tokar | | 210/238 |
| 6,264,713 B1 * | 7/2001 | Lewis, II | | 55/481 |
| 6,319,300 B1 * | 11/2001 | Chen | | 55/497 |
| 6,485,538 B1 * | 11/2002 | Toyoshima | | 55/490 |
| 6,723,150 B2 * | 4/2004 | Parker | | 55/521 |
| 6,955,696 B1 * | 10/2005 | Ost et al. | | 55/357 |
| 7,070,641 B1 * | 7/2006 | Gunderson et al. | | 55/497 |
| 7,300,486 B1 * | 11/2007 | Kirsch | | 55/502 |
| 7,312,990 B2 * | 12/2007 | Mangold | | 361/695 |
| 7,524,362 B2 * | 4/2009 | Wu et al. | | 96/15 |
| 7,588,629 B2 * | 9/2009 | Osborne et al. | | 96/129 |
| 7,776,122 B2 * | 8/2010 | Feldmann | | 55/481 |
| 7,901,479 B2 * | 3/2011 | Osborne et al. | | 55/481 |
| 2002/0157540 A1* | 10/2002 | Lynn | | 96/222 |
| 2005/0204922 A1* | 9/2005 | Wu et al. | | 96/66 |

* cited by examiner

*Primary Examiner* — Duane Smith
*Assistant Examiner* — Amber Orlando
(74) *Attorney, Agent, or Firm* — Advent IP, P.C., L.L.O.

(57) ABSTRACT

A device for securing an emission control element by a gastight seal within an exhaust system, and a device to secure loose hardware within an exhaust system. The device for securing the emission control element includes a structure that surrounds the emission control element and a structure that pushes against the emission control element. The structure that pushes against the emission control element uses a system of angled grooves and pushing means to create a force that holds the emission control element in place. The device to secure loose hardware includes a length of wire, the end of which is formed into a loop around the body of the hardware.

6 Claims, 11 Drawing Sheets

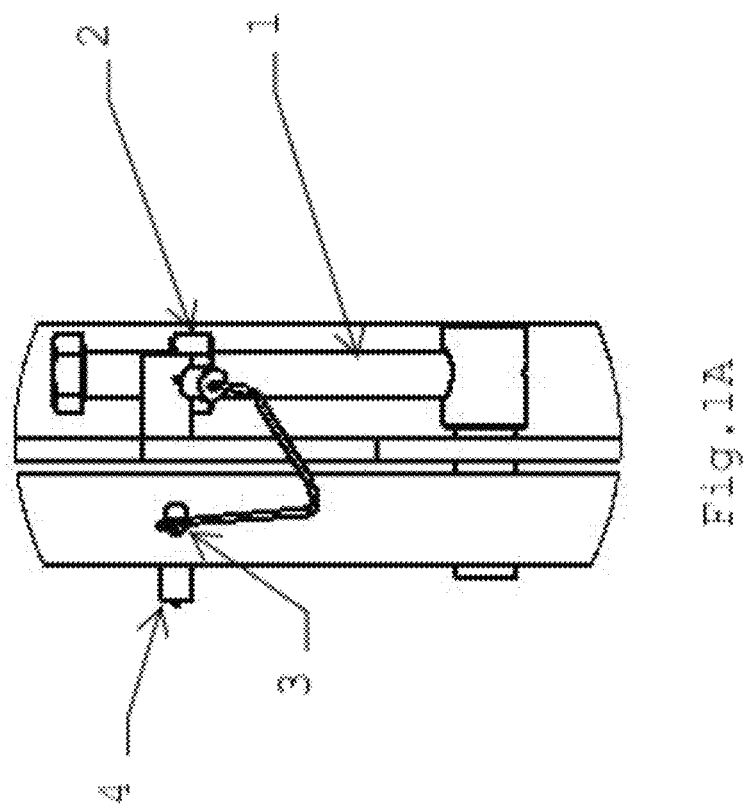

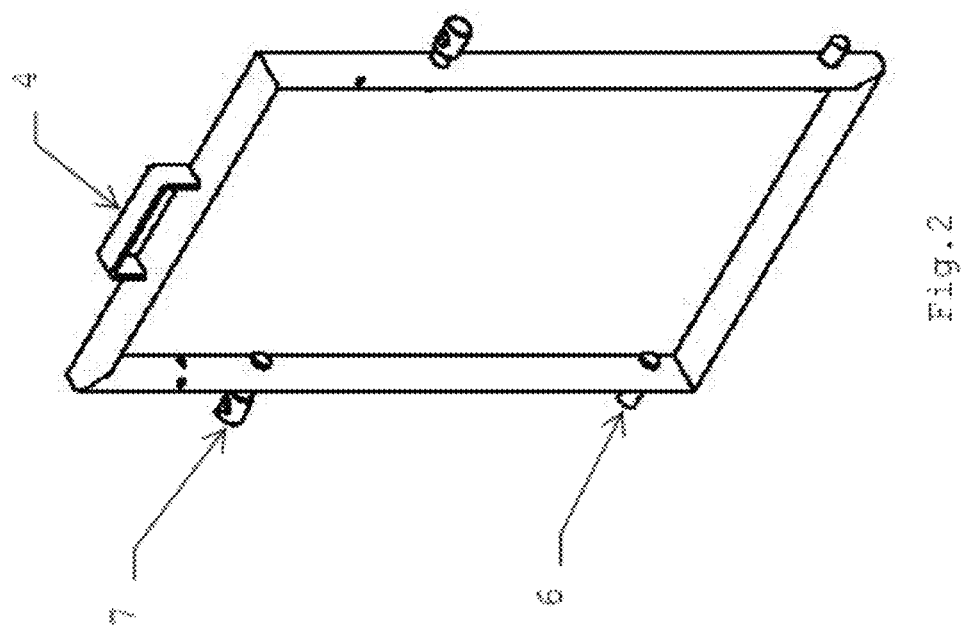

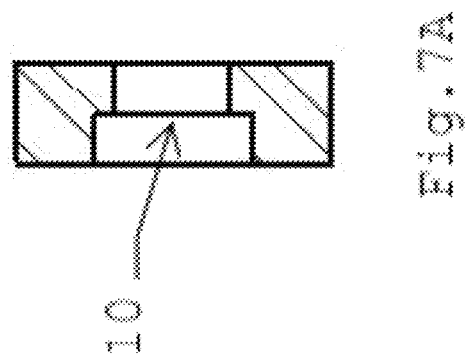

SUPPORT SYSTEM FOR EXHAUST EMISSION CONTROL ELEMENTS

BACKGROUND AND PRIOR ART

Figure 1:
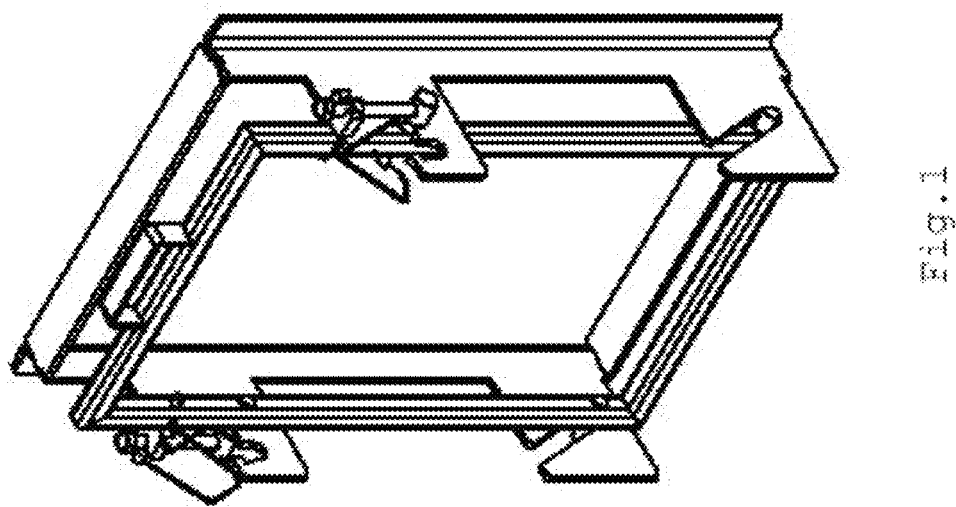

Exhaust systems that employ emission control elements must necessarily channel all gas flow through the emission control elements to be effective. The present invention relates only to exhaust systems that employ such emission control elements, therefore any reference to exhaust systems should be understood to refer only to exhaust systems that include emission control elements. Furthermore, the present invention relates only to exhaust systems where the emission control elements are removable, therefore any reference to exhaust systems should be understood to refer only to exhaust systems with removable emission control elements.

Emission control elements are known in the art; they include, but are not limited to, filters, two-way catalytic converters and three-way catalytic converters. Any reference to emission control elements should be understood to refer to all units, known in the art of exhaust systems, that are intended and designed to be periodically serviced or replaced, and through which exhaust gas must flow for the exhaust system to be effective.

TECHNICAL FIELD

The present invention relates to emission control systems. Specifically, the invention teaches a device that holds prefabricated, removable emission control elements inside an exhaust system, creates a gastight seal, and allows emission control elements to be replaced through a single access point only marginally larger than the cross-section of the emission control element itself.

In the art of emission control, an engine is connected to an exhaust system; within the exhaust system, emission control elements remove particulate matter from the exhaust, or convert exhaust gas into another gas such as carbon dioxide. Over the years, emission control systems have become more and more efficient in response to changing environmental regulations.

Effective emission control systems today require gastight seals at every point in the exhaust system. Most of the components in an exhaust system can be welded together; proper welding creates a gastight seal. Emission control elements cannot be welded into the exhaust system because those elements require periodic servicing and replacement.

Several methods are known in the industry for holding emission control elements in place within an exhaust system, and for creating a gastight seal. Some systems use adhesives to bond an emission control element to an internal surface within the exhaust system. The use of adhesives is ineffective because the high operating temperatures within the exhaust system tend to destroy the adhesive. Other systems use an emission control element surrounded by a gasket; the gasket creates friction which holds the element in place once it is inserted into the exhaust system. The gasket friction method is ineffective because the high operating temperatures of the exhaust system tend to warp parts held in place by friction; warping destroys the gastight seal.

Therefore, an object of the present invention is to provide a device to hold an emission control element in place within an exhaust system, and create a gastight seal around the entire perimeter of the emission control element.

Emission control elements require periodic servicing and replacement. Servicing an emission control element generally means accessing the internal components of the exhaust system. The gastight integrity of the exhaust system may be compromised if the exhaust system contains numerous access points or very large access points.

Emission control elements held in place by adhesives are difficult to replace because the adhesive seal must be broken before the element can be replaced. Emission control elements held in place by the gasket friction method are necessarily difficult to replace because the emission control element and gasket must fit very tightly within the system to be effective.

Therefore, a further object of the present invention is to provide a device to hold an emission control element in place within an exhaust system, and allow the emission control element to be easily removed and replaced without compromising the gastight integrity of the exhaust system.

Because an effective exhaust system must be gastight, and because multiple access points may compromise the gastight integrity of an exhaust system, an effective exhaust system must account for the accessibility of the hardware required to hold emission control elements in place. Hardware such as screws or bolts could be dropped inside an exhaust system whenever a user removes or replaces an emission control element. Such lost hardware could be difficult or impossible to retrieve from an exhaust system.

Therefore, an object of the present invention is to provide a device to secure all necessary hardware to an accessible location within the exhaust system.

SUMMARY

Emission control elements are most effective when all the exhaust gas in an exhaust system passes through the elements. To facilitate gas flow through the emission control elements, an exhaust system is typically divided into a gas inlet chamber and a gas outlet chamber. Engine exhaust feeds directly into the gas inlet chamber and the pressure of the incoming exhaust forces the gas in the gas inlet chamber into the gas outlet chamber. The only path from the gas inlet chamber to the gas outlet chamber is through one or more emission control elements. The gas outlet chamber then expels treated gas from the exhaust system.

Where the present invention would be used, the gas inlet chamber and the gas outlet chamber would be separated by a membrane. The membrane would contain one or more openings; those openings would be the only paths by which gas could move from the gas inlet chamber to the gas outlet chamber.

The present invention teaches a device comprising a plate frame weldment comprising a plurality of angle plates, at least one bolt holder tab affixed to an angle plate, and a plurality of cross braces. The plate frame weldment would be permanently attached to the membrane separating the gas inlet chamber from the gas outlet chamber. The plate frame weldment would completely surround one or more openings in the membrane. Each membrane could contain as many plate frame weldments as necessary to accommodate the volume of gas flowing from the gas inlet chamber to the gas outlet chamber in a given exhaust system.

The device of the present invention would also comprise a tube frame weldment comprising a frame, a plurality of track bars to engage the angle plates of the plate frame weldment, and a means for moving the tube frame weldment such as a handle. The tube frame weldment may further comprise one or more machined track bars each with a groove capable of receiving a bolt. The tube frame weldment would engage the angle plates of the plate frame weldment. One or more emission control elements would be placed between the plate frame weldment and the tube frame weldment. The tube frame weldment would then be positioned parallel with the plate frame weldment.

The device of the present invention would also comprise one or more nuts and bolts. The nuts and bolts would be used together to create a pushing means to create a force that would hold the tube frame weldment in place, and thus create a gastight seal between the membrane and the emission control elements.

The pushing force would be created with a nut, a bolt, a surface capable of receiving the threaded end of the bolt, and a surface comprising a flat area capable of opposing the nut and a hole or groove large enough to allow the threaded portion of the bolt to pass through but small enough prevent the nut from passing through. The surface comprising a flat area capable of opposing the nut and a hole or groove large enough to allow the threaded portion of the bolt to pass through but small enough to prevent the nut from passing through, may further comprise a means for preventing the nut from turning when the bolt is turned, such as a groove in the flat area capable of holding the edges of the nut.

The present invention also teaches a device comprising a lanyard and a bolt. One end of the lanyard would be permanently attached to an internal surface or component of an exhaust system, easily accessible from an access point in that exhaust system. The other end of the lanyard would be attached to a bolt.

LIST OF FIGURES

FIG. 1 includes a perspective view of the preferred embodiment of the present invention.

FIG. 1A includes a detailed front view of the device comprised of a bold, nut and lanyard.

FIG. 2 includes a perspective view of the preferred embodiment of a tube frame weldment.

Figure 2A:
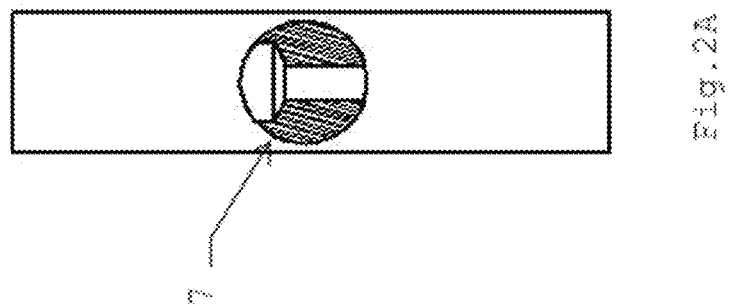

FIG. 2A includes a detailed side view of the preferred embodiment of a machined track bar.

Figure 3:
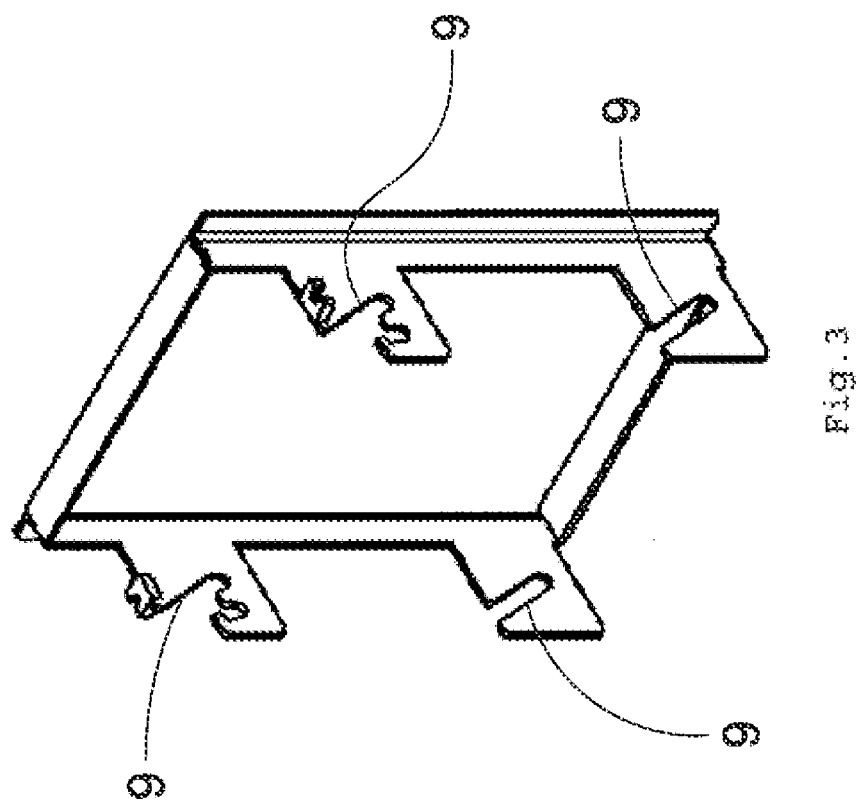

FIG. 3 includes a perspective view of the preferred embodiment of a plate frame weldment.

Figure 4:
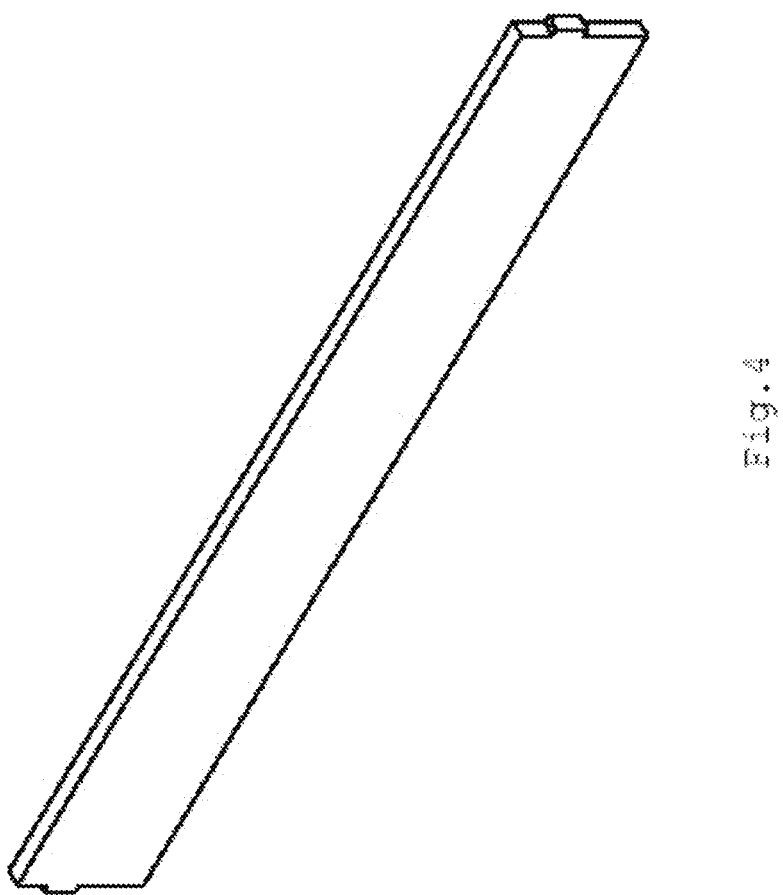

FIG. 4 includes a perspective view of the preferred embodiment of a cross brace.

Figure 5:
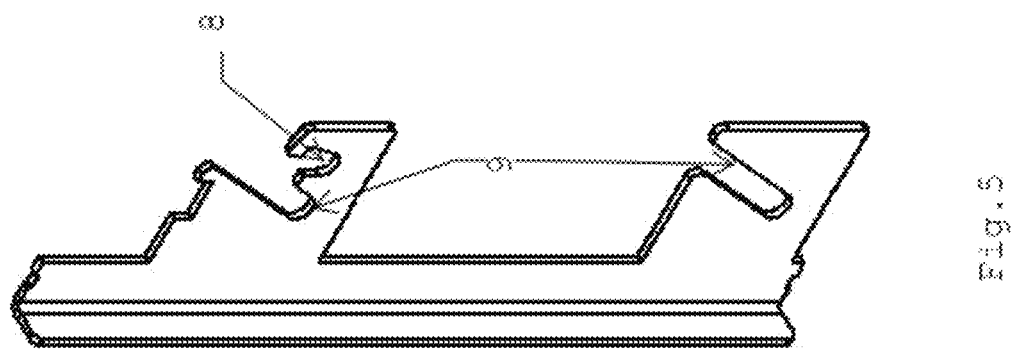

FIG. 5 includes a perspective view of the preferred embodiment of an angle plate.

Figure 6:
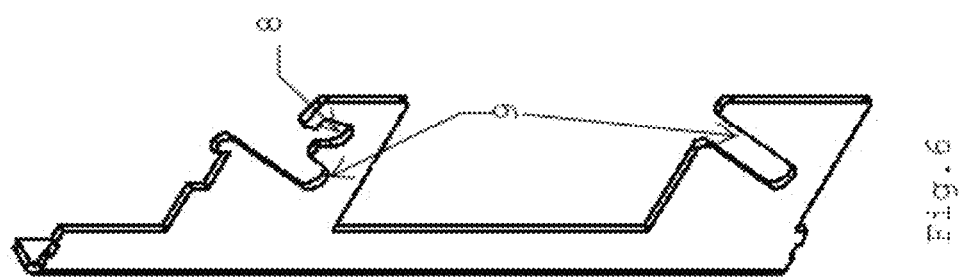

FIG. 6 includes a perspective view of the preferred embodiment of an angle plate.

Figure 7:
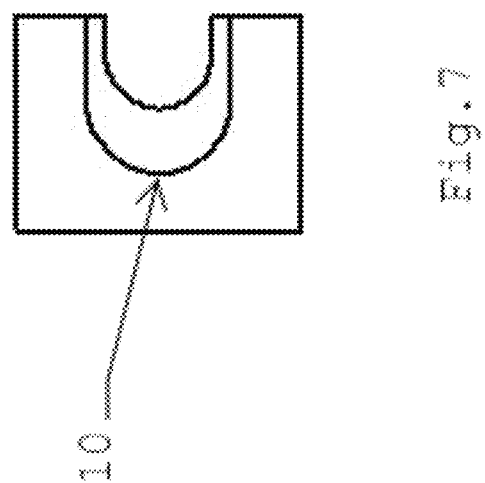

FIG. 7 includes a bottom view of the preferred embodiment of a bolt holder tab.

FIG. 7A includes a sectional view of the preferred embodiment of a bolt holder tab.

Figure 8:
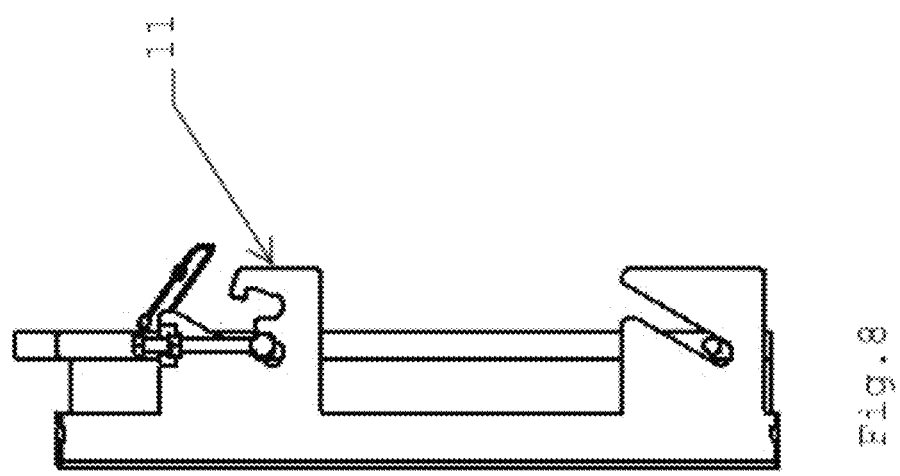

FIG. 8 includes a side view of the preferred embodiment of the present invention.

DESCRIPTION OF INVENTION

The present invention teaches a device comprising a plate frame weldment, a tube frame weldment and a pushing means to apply force between the plate frame weldment and the tube frame weldment.

The plate frame weldment comprises a plurality of cross braces, a plurality of angle plates, and at least one bolt holder tab joined to an angle plate. The cross braces are arranged parallel to each other and function primarily to maintain consistent distance between the angle plates and to constrain emission control elements when installed. Each angle plate comprises a surface with angled grooves; each angled groove is open at one end and all angled grooves run parallel. The cross braces are joined to the angled plates so that all angle plates are parallel, and all angled grooves in all angle plates are parallel. The plate frame weldment is permanently joined to a membrane separating a gas inlet chamber from a gas outlet chamber. When an emission control element is installed, the emission control element has one surface contacting the membrane and is bounded around its entire perimeter by either cross-braces, angle plates or other emission control elements also installed. At least one bolt holder tab is joined to an angle plate, approximately perpendicular to the angle plate. The bolt holder tab comprises a surface against which a pushing means can act to apply force in the same approximate orientation as the angled grooves in the angle plate.

The tube frame weldment comprises a frame, a plurality of track bars, and a means for moving the tube frame weldment. The tube frame weldment may further comprise one or more machined track bars. The frame is a support structure intended to hold emission control elements in place, within the area defined by the plate frame weldment. The frame fits between the outermost angle plates and contacts the surface of an emission control element, opposite the surface contacting the membrane, when the emission control element is installed. The track bars are joined to the sides of the tube frame weldment facing the angle plates of the plate frame weldment at points that would allow the track bars to engage the angled grooves in the angle plates. Because the track bars are intended to engage the angled grooves of the angle plates, the track bars must correspond in size and shape to the angled grooves. Any track bar may be replaced with a machined track bar. A machined track bar is functionally equivalent to a track bar and therefore must also correspond in size and shape to the angled grooves. The machined track bar has a groove capable of constraining the threaded end of a bolt, though the groove itself is not threaded. Machined track bars are only effective when used in place of a track bar that would engage an angled groove with a bolt holder tab in close proximity. The tube frame weldment must be moved to gain access to the emission control elements it is intended to hold in place; therefore the tube frame weldment must have a means for moving the tube frame weldment. When the tube frame weldment is properly positioned, it should not move significantly except in the direction of the angled grooves. The means for moving the tube frame weldment may be any means that would accomplish that movement. Such means may be nothing more than the frame itself if the frame is accessible.

The pushing means may be any means capable of applying a force against a bolt holder tab and some portion of the tube frame weldment, and thereby push the tube frame weldment along the angled grooves of the angle plates. The purpose of the pushing means is to push the tube frame weldment along the angled grooves which, because they are angled, will thereby push the tube frame closer to the membrane. Because emission control elements are installed between the tube frame weldment and the membrane, the pushing means acts to secure the emission control elements and create a gastight seal between the emission control elements and the membrane.

The present invention also teaches a device comprising a lanyard and a bolt.

The lanyard comprises a flexible cable able to withstand the operating temperatures of an exhaust system. One end of the lanyard is attached to an internal surface of an exhaust system with an emission control element support system previously described. The other end of the lanyard is attached to the bolt. The lanyard is long enough to allow the user to use the bolt as part of the pushing means previously described.

One or more plate frame weldments are permanently attached to the membrane between the gas inlet chamber and the gas outlet chamber of the exhaust system. Each plate frame weldment completely surrounds one or more openings in the membrane. Each plate frame weldment is attached to the membrane such that it is accessible from an access point in the exhaust system.

Each plate frame weldment has a corresponding tube frame weldment. The tube frame weldment is installed by aligning the track bars or machined track bars of the tube frame weldment with corresponding angled grooves in the angle plates of the plate frame weldment. The tube frame weldment then moves along the grooves as necessary to install emission control elements or hold them in place.

Emission control elements of appropriate size are installed between the plate frame weldment and the tube frame weldment. Emission control elements of appropriate size are those that fit within the bounds defined by the plate frame weldment and would be held securely in place against the membrane when the tube frame weldment is installed.

The user then uses a pushing means to create a force pushing against both a bolt holder tab and a corresponding track bar. Such force pushes the tube frame weldment along the angled grooves of the angle plates in the plate frame weldment. Because the angled grooves are angled, the pushing force serves to push the tube frame weldment against the emission control element, and the emission control element against the membrane creating a gastight seal between the emission control element and the membrane. The user may put a gasket material between the membrane and the emission control element to facilitate the gastight seal.

Preferred Embodiment

The preferred embodiment of the invention comprises a plate frame weldment (FIG. 3), a tub frame weldment (FIG. 2) and a pushing means comprising nuts and bolts (FIG. 1A).

The preferred embodiment of the plate frame weldment comprises two cross braces (FIG. 4), two angle plates (FIGS. 5 and 6) and two bolt holder tabs (FIGS. 7 and 7A). The two cross braces are flat metal bars of equal length aligned parallel, with the broad surfaces facing each other. The two angle plates are flat metal surfaces, aligned parallel to each other. The cross-braces are joined, at their ends, to the angle plates, also at their ends, to form a rectangle. The cross braces and angle plates are joined such that, when further joined to a membrane separating a gas inlet chamber from a gas outlet chamber in an exhaust system, the angle plates protrude perpendicular to the membrane. Each angle plate further includes two angled grooves (9). Each angled groove is open at one end and oriented such that, when joined to a membrane, each angled groove would run from a point some distance from the membrane at the open end to a terminus, within the angle plate surface, closer to the membrane. The termini of all angled grooves are approximately the same distance from the membrane. The angled grooves are oriented at approximately a thirty (30) degree angle from the membrane. When installed in an exhaust system, the plate frame weldment is joined to the membrane where accessible from an access point to the interior of the exhaust system, and oriented such that the open ends of two corresponding angled grooves face the access point and are easily reachable from the access point. Each angle plate may further comprise a groove near the open end of one or more angled grooves (9) such that the corresponding track bars or machined track bars of a tube frame weldment could sit in those grooves and be held in place by gravity. The groove near the open end of the angled groove may also take the form of a groove with a corresponding protrusion at the opening of the groove, such that, when inserted, the track bar or machined track bar would be prevented by the protrusion from spontaneously falling out of the groove in most operational orientations (8). A bolt holder tab is jointed to the outside of each angle plate at the open end of each of the two angled grooves accessible from the access point, oriented perpendicular to the surface of the angle plate and perpendicular to the direction of the angled grooves. Each bolt holder tab comprises a metal surface and a groove in that surface large enough to admit the body of a bolt but smaller than a corresponding nut. The groove is positioned such that a bolt placed in the groove would run along side the corresponding angled groove. Each bolt holder tab may further comprise a portion around the groove furthest from the exhaust system access point milled so that a nut resting in the milled area (10) would be held by its sides and prevented from turning.

The preferred embodiment of the tube frame weldment is a frame comprised of a rigid rectangular metal frame, two track bars (6), two machined track bars (7) and a handle (5). The frame is small enough to fit between the two angle plates of the plate frame weldment. The two machined track bars are joined to the frame to correspond to the two angled grooves with corresponding bolt holder tabs. The two track bars are joined to the frame to correspond to the other two angled grooves. The handle is joined to the portion of the frame facing the access point to the exhaust system when the tube frame weldment is installed.

The preferred embodiment of the pushing means is two nuts and two bolts. The nuts and bolts referred to are commonly known. A nut is screwed onto each bolt by ordinary means. When the tube frame weldment is installed, a bolt with a corresponding nut is placed in each bolt holder tab such that the head of the bolt is nearest the access point of the exhaust system, and the threaded end of the bold is nearest a machined track bar of the tube frame weldment; and the bolt holder tab is between the head of the bolt and the nut. The head of each bolt is turned while the nut is held stationary such that nut moves toward the head of the bolt until the nut makes contact with the bolt holder tab. The bolt continues to be turned while the nut is held stationary until the threaded end of the bolt engages the groove in the machined track bar of the tube frame weldment. From this point, the bolt may be turned while the nut is held stationary to apply a force between the bolt holder tab and the machined track bar; the nuts and bolts thereby function as the pushing means.

The preferred embodiment of the lanyard and bolt is a metal rope (3) with one end attached to a tube frame weldment and the other end formed into a loop around the bolt (1) by crimping the end of the rope to another portion of the rope with an oval sleeve. The end of the rope is attached to the tube frame weldment by a rivet. The end of the rope may also be attached by drilling a small hole through the tube frame weldment, passing the rope through the hole, and crimping an oval sleeve to the end of the rope such that the rope could not pass back out through the hole.

The inventors claim:

1. A device suitable for holding an emission control element and forming a gastight seal within an exhaust system, such device comprising (1) a plate frame weldment comprising
  (a) a plurality of angle plates, each with at least one angled groove,
  (b) a plurality of cross braces, and
  (c) one or more bolt holder tabs affixed to one or more angle plates at the opening of the angled groove in the angle plate,
(2) a tube frame weldment comprising
  (a) a frame,
  (b) a plurality of track bars,
  (d) a means of moving the tube frame weldment, and
(3) at least one pushing means to apply a force against a bolt holder tab and some portion of the tube frame weldment.

2. The device of claim 1 further comprising
  (1) a groove in the angle plate, near the angled groove, and
  (2) a protrusion near the groove.

3. The device of claim 1 where the pushing means is at least one nut and bolt.

4. The device of claim 1 further comprising a gasket.

5. The device of claim 1 where the tube frame weldment further comprises one or more machined track bars, each with a groove capable of receiving a bolt.

6. The device of claim 5 where the portion of the tube frame weldment acted on by the pushing means is a machined track bar.

\* \* \* \* \*